(12) United States Patent
Greene et al.

(10) Patent No.: US 9,045,025 B1
(45) Date of Patent: Jun. 2, 2015

(54) ARTICULATED GULL WING DOOR

(71) Applicant: Spintek Filtration, Inc., Los Alamitos, CA (US)

(72) Inventors: William Greene, Long Beach, CA (US); Jose Pauletti, Irvine, CA (US); Jason Gilmour, Fountain Valley, CA (US)

(73) Assignee: Spintek Filtration, Inc., Los Alamitos, CA (US)

( * ) Notice: Subject to any disclaimer, the term of this patent is extended or adjusted under 35 U.S.C. 154(b) by 0 days.

(21) Appl. No.: 14/265,969

(22) Filed: Apr. 30, 2014

(51) Int. Cl.
*B60J 5/04* (2006.01)
*B60J 5/06* (2006.01)
*B60Q 1/24* (2006.01)
*B60Q 1/00* (2006.01)

(52) U.S. Cl.
CPC ........ *B60J 5/06* (2013.01); *B60J 5/0473* (2013.01); *B60Q 1/24* (2013.01); *B60Q 1/0035* (2013.01)

(58) Field of Classification Search
CPC ............ B60J 5/04; B60J 5/047; B60J 5/0472; B60J 5/0473; B60J 5/06; B60J 2005/0475
USPC ................... 296/155, 146.11–146.13, 146.1
See application file for complete search history.

(56) References Cited

U.S. PATENT DOCUMENTS

| | | | | |
|---|---|---|---|---|
| 2,551,054 | A * | 5/1951 | Jean-Baptiste Sanmori | ... 49/140 |
| 2,903,296 | A * | 9/1959 | Barenyi | .......... 296/146.13 |
| 2,938,749 | A * | 5/1960 | Podolan et al. | ......... 296/146.11 |
| 3,511,530 | A * | 5/1970 | Barenyi | .......... 296/146.13 |
| 4,017,117 | A * | 4/1977 | Eggert, Jr. | ............ 296/146.9 |
| 4,378,658 | A | 4/1983 | DeLorean | |
| 4,473,252 | A * | 9/1984 | Tomforde et al. | ......... 296/146.2 |
| 4,684,167 | A * | 8/1987 | Newmayer | ................. 296/202 |
| 4,940,282 | A | 7/1990 | Townsend | |
| 5,013,082 | A * | 5/1991 | Landmesser | ............. 296/202 |
| 5,094,501 | A * | 3/1992 | Gersmann | ................. 296/155 |
| 5,242,208 | A * | 9/1993 | Ohya | .................... 296/146.1 |
| 5,378,036 | A * | 1/1995 | Townsend | ................. 296/155 |
| 5,992,918 | A * | 11/1999 | Gobart et al. | ........... 296/146.13 |
| 7,097,742 | B2 | 8/2006 | Furuse | |
| 7,100,245 | B2 | 9/2006 | Wohlfarth | |

(Continued)

FOREIGN PATENT DOCUMENTS

| | | |
|---|---|---|
| CN | 202788496 | 3/2013 |
| DE | 102005021333 | 12/2005 |
| JP | 08-216689 | 8/1996 |

*Primary Examiner* — Gregory Blankenship
(74) *Attorney, Agent, or Firm* — Carmody Torrance Sandak & Hennessey LLP (57) ABSTRACT

An articulated gull-wing door is described. The articulated gull-wing door comprises an upper section and a lower section mounted in a modular frame or directly in the body of a motor vehicle between two pillars. The upper section is overlapable with the lower section when the door is in a closed position to provide a leak proof interface. The upper section is attached to a top of the modular frame with a plurality of hinges and comprises a sliding rod that is couplable to a mechanical link in the lower section. The lower section comprises a plurality of linear bearings arranged at an upper portion of a front side and a rear side of the lower section to slidably couple the lower section to corresponding rails attached to upper front and upper rear portions of the modular frame. The lower section is capable of slidably displacing itself in a vertical direction on the rails in the modular frame to fixed upper pivot points and then rotating upward upon the fixed upper pivot points to a fully opened position.

18 Claims, 8 Drawing Sheets

(56) References Cited

U.S. PATENT DOCUMENTS

| | | | |
|---|---|---|---|
| 8,449,015 B2* | 5/2013 | Brown et al. | 296/146.12 |
| 2007/0120395 A1* | 5/2007 | Geyrhofer et al. | 296/146.11 |
| 2007/0126260 A1* | 6/2007 | Geyrhofer et al. | 296/146.12 |
| 2007/0158974 A1* | 7/2007 | Woodhouse et al. | 296/146.11 |
| 2007/0283535 A1 | 12/2007 | Hoffman | |
| 2009/0106936 A1 | 4/2009 | Greenbank | |
| 2010/0259067 A1* | 10/2010 | Bell et al. | 296/146.11 |

* cited by examiner

ARTICULATED GULL WING DOOR

FIELD OF THE INVENTION

The present invention relates generally to an articulated gull wing door for a motor vehicle.

BACKGROUND OF THE INVENTION

It is typical of motor vehicles to have a front door opening and an optional rear door opening that are respectively closable with separate front and/or rear doors. Most vehicles on our roads are equipped with conventional doors that are either hinged at the front-facing edge of the door or (in some instances) on the rear-facing edge, thus allowing the door to swing outward horizontally from the body of the car. Other configurations include gull-wing doors and scissor doors that rotate upward.

Gull-wing doors are doors that are hinged at the roof of the vehicle and thus open out and up. Scissor doors are typically hinged on the front pillar of the vehicle and also open in upward motion. On both gull-wing and scissor doors, the opening process is typically supported by pressurized cylinders so that the door does not close under its own weight.

Examples of automobiles with gull-wing doors including the 1950s Mercedes Benz 300SL and the 1980s DeLorean DMC-12. More recently, the Mercedes Benz SLS AMG and the Tesla Model X have also incorporated gullwing doors.

The door design of the Mercedes Benz SL provided an unusual chassis design that necessitated a very high door sill and required that the doors be smaller than would otherwise have been optimal. The door design of the DeLorean attempted to solve these problems by using a solid steel torsion bar to counterbalance a full size door and pneumatic struts to open the doors dampen movement of the doors.

A typical gull-wing door has a one piece configuration that is hinged at the roof, as described, for example, in U.S. Pat. No. 4,378,658 to DeLorean, the subject matter of which is herein incorporated by reference in its entirety. The use of articulated gull-wing doors has also been suggested and examples of articulated gull-wing doors can be found, for example, in U.S. Pat. No. 5,992,918 to Hoffman, and in U.S. Pat. No. 8,449,015 to Brown et al., the subject matter of each of which is herein incorporated by reference in its entirety. In addition, DE 10200502133A1 to Volkswagen describes a vehicle door, including a gull-wing door, that is of a telescopic form and in which the lower region of the door is able to slide over the upper part of the door.

An advantage of gull-wing doors is that when properly designed, they allow much better entrance/egress than conventional doors, thus more easily facilitating access for passengers as well as storage of wheelchairs and cargo. However, these doors typically require more vertical clearance when the door is in a fully open position. Thus, it is would be desirable to minimize the distance by which the door extends above the vehicle body, thus limiting interference with a garage ceiling or other potential obstruction. It would also be desirable to limit the horizontal side clearance needed to open the door.

While various gull-wing door configurations have been suggested, further improvements to gull-wing door configurations are also be desirable, including minimizing still further the side clearance necessary to open the door while at the same time also minimizing the distance by which the door extends above the vehicle body when in a fully open position.

In addition, it would also be desirable to provide an improved gull-wing door kit, including components and assemblies, which would allow automotive manufacturers and aftermarket enthusiasts the ability to incorporate gull-wing door operating in currently designed automobiles, without any modification to the automobile body.

SUMMARY OF THE INVENTION

It is an object of the present invention to provide an improved gull-wing door structure that minimizes the distance by which the door extends above the vehicle body.

It is another object of the present invention to provide a gull-wing door structure that minimizes the side clearance necessary to open the door.

It is still another object of the present invention to provide a gull-wing door structure that allows for easy entry and egress from the vehicle interior.

It is still another object of the present invention to provide a kit for retrofitting an automobile with a gull-wing door without any modification to the vehicle body.

To that end, in one embodiment, the present invention relates generally to an articulated gull-wing door arranged in a vehicle body, wherein the vehicle body comprises at least front and a rear pillars, the articulated gull-wing door comprising:

an upper section and a lower section mounted in the vehicle body between the front and rear pillars, wherein the upper section is overlapable with the lower section when the door is in a closed position to provide a leak proof interface;

wherein the upper section is attached to a top of the vehicle body with a plurality of hinges and wherein the upper section comprises a sliding rod that is coupled to a mechanical link in the lower section; and wherein the lower section comprises a plurality of linear bearings arranged at an upper portion of a front side and a rear side of the lower section to slidably couple the lower section to corresponding rails attached to upper front and upper rear portions of the portion of the vehicle body between the front and rear pillars, wherein the lower section is capable of slidably displacing itself in a vertical direction on the rails to fixed upper pivot points and then rotating upward upon the fixed upper pivot points to a fully opened position.

In another embodiment, the present invention also relates generally to a kit for retrofitting a motor vehicle with a gull-wing door, the kit comprising:

a modular frame configured to extend between the front and rear pillars of a motor vehicle body; and an articulated gull-wing door arranged within the modular frame, wherein the articulated gull-wing door comprises:

an upper section and a lower section mounted in the modular frame, wherein the upper section is overlapable with the lower section when the door is in a closed position to provide a leak proof interface;

wherein the upper section is attached to a top of the modular frame with a plurality of hinges and wherein the upper section comprises a sliding rod that is couplable to a mechanical link in the lower section; and wherein the lower section comprises a plurality of linear bearings arranged at an upper portion of a front side and a rear side of the lower section to slidably couple the lower section to corresponding rails attached to upper front and upper rear portions of the modular frame, wherein the lower section is capable of slidably displacing itself in a vertical direction on the rails in the modular frame to fixed upper pivot points and then rotating upward upon the fixed upper pivot points to a fully opened position.

The gull-wing door operates such that a portion of the lower section slides or opens into space revealed when the upper section correspondingly opens. This minimizes the side clearance necessary when opening the door and minimizes the angle to which the door must be opened to provide suitable space for entering or exiting the vehicle. The upper section of the door is located in the roof of the vehicle such that when it correspondingly opens with the lower section of the door, the opening upper section provides room for the lower section of the door to slide and/or rotate into.

BRIEF DESCRIPTION OF THE FIGURES

For a fuller understanding of the invention, reference is had to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

The present invention relates generally to an articulated gull-wing door for a motor vehicle.

In one embodiment, the present invention relates generally to an articulated gull-wing door arranged in a vehicle body, wherein the vehicle body comprises at least front and rear pillars, the articulated gull-wing door comprising:

an upper section and a lower section, wherein the upper section is overlapable with the lower section when the door is in a closed position to provide a leak proof interface between the upper section and the lower section;

wherein the upper section is attached to a top portion of the vehicle body between the front and rear pillars with a plurality of hinges and wherein the upper section comprises a sliding rod that is coupled to a mechanical link in the lower section; and wherein the lower section comprises a plurality of linear bearings arranged at an upper portion of a front side and a rear side of the lower section to slidably couple the lower section to corresponding rails, wherein the lower section is capable of slidably displacing itself in a vertical direction on the rails to fixed upper pivot points and then rotating upward upon the fixed upper pivot points to a fully opened position.

Figure 1:
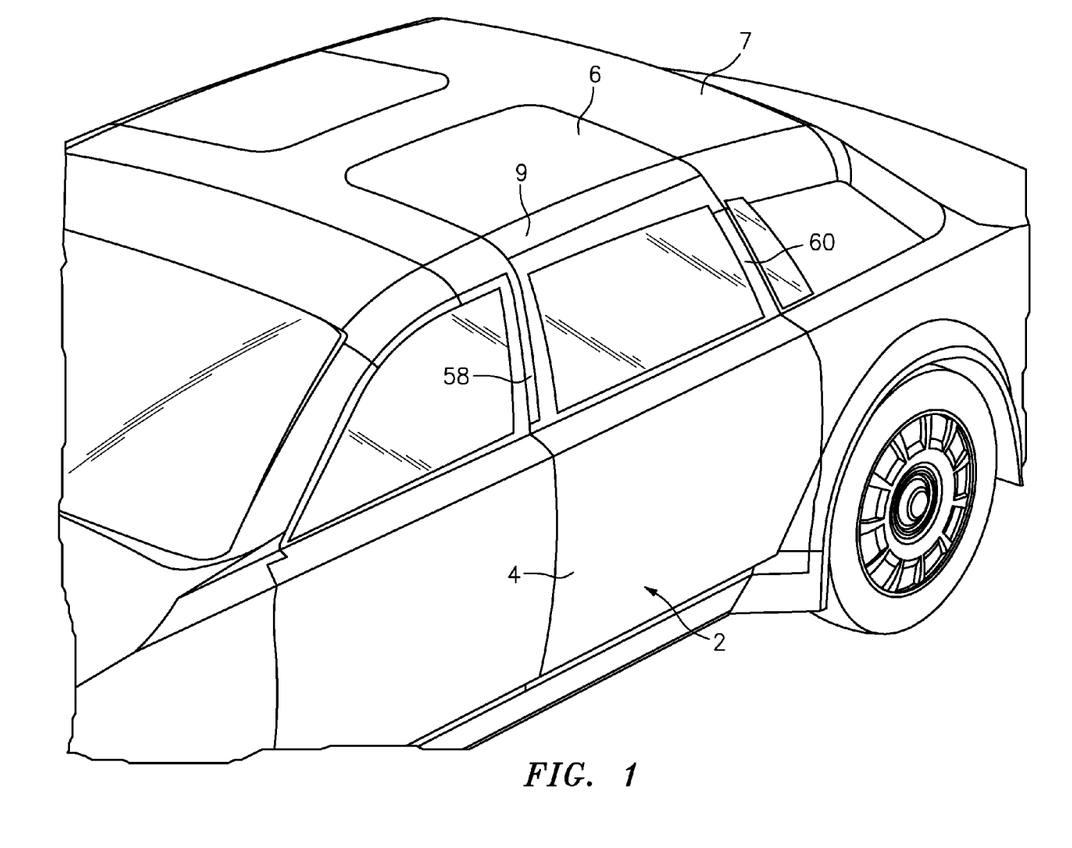
FIG. 1 depicts a view of a gull-wing door in a closed position in accordance with the present invention.
Figure 2:
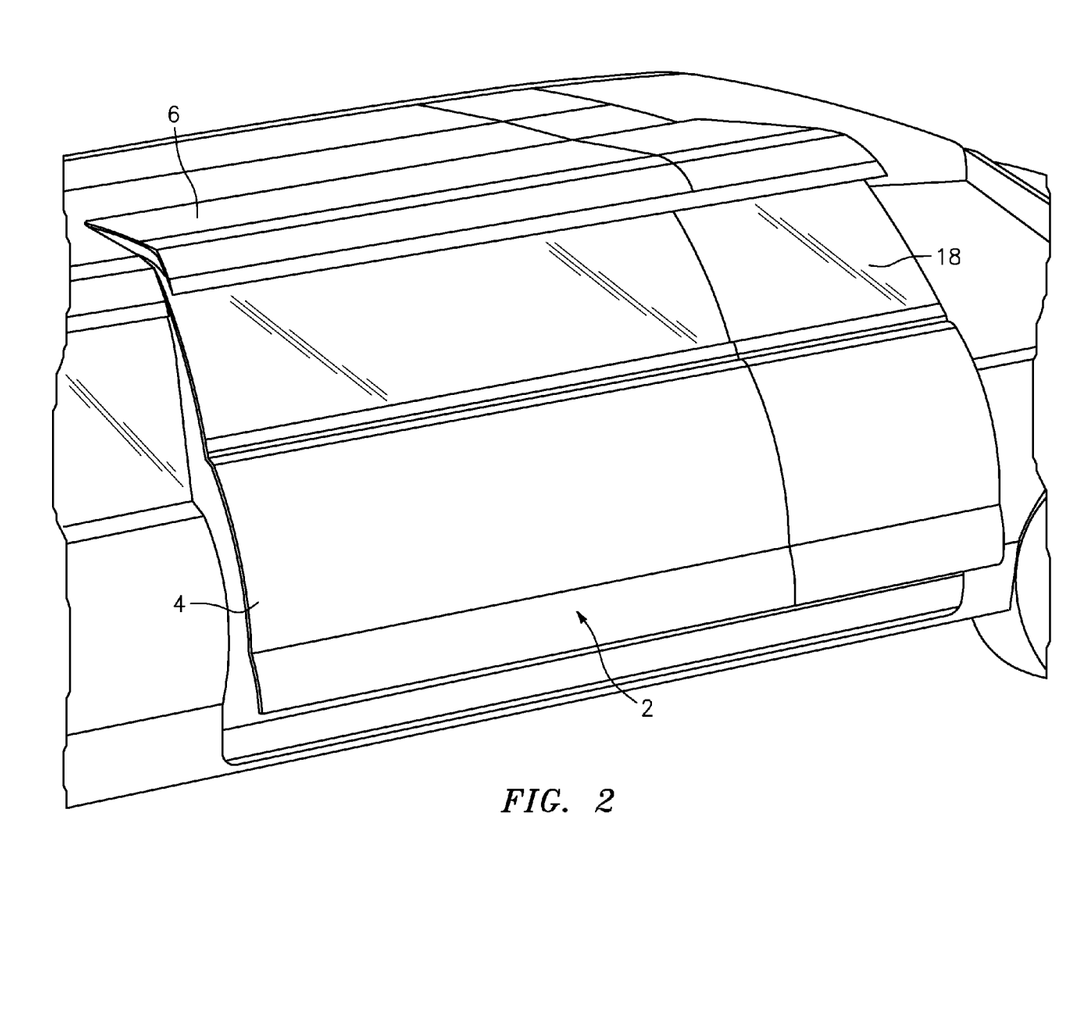
FIG. 2 depicts a view of the gull-wing door in accordance with the present invention in which the door has been unlatched and is able to begin moving from a closed position to an open position.
Figure 3:
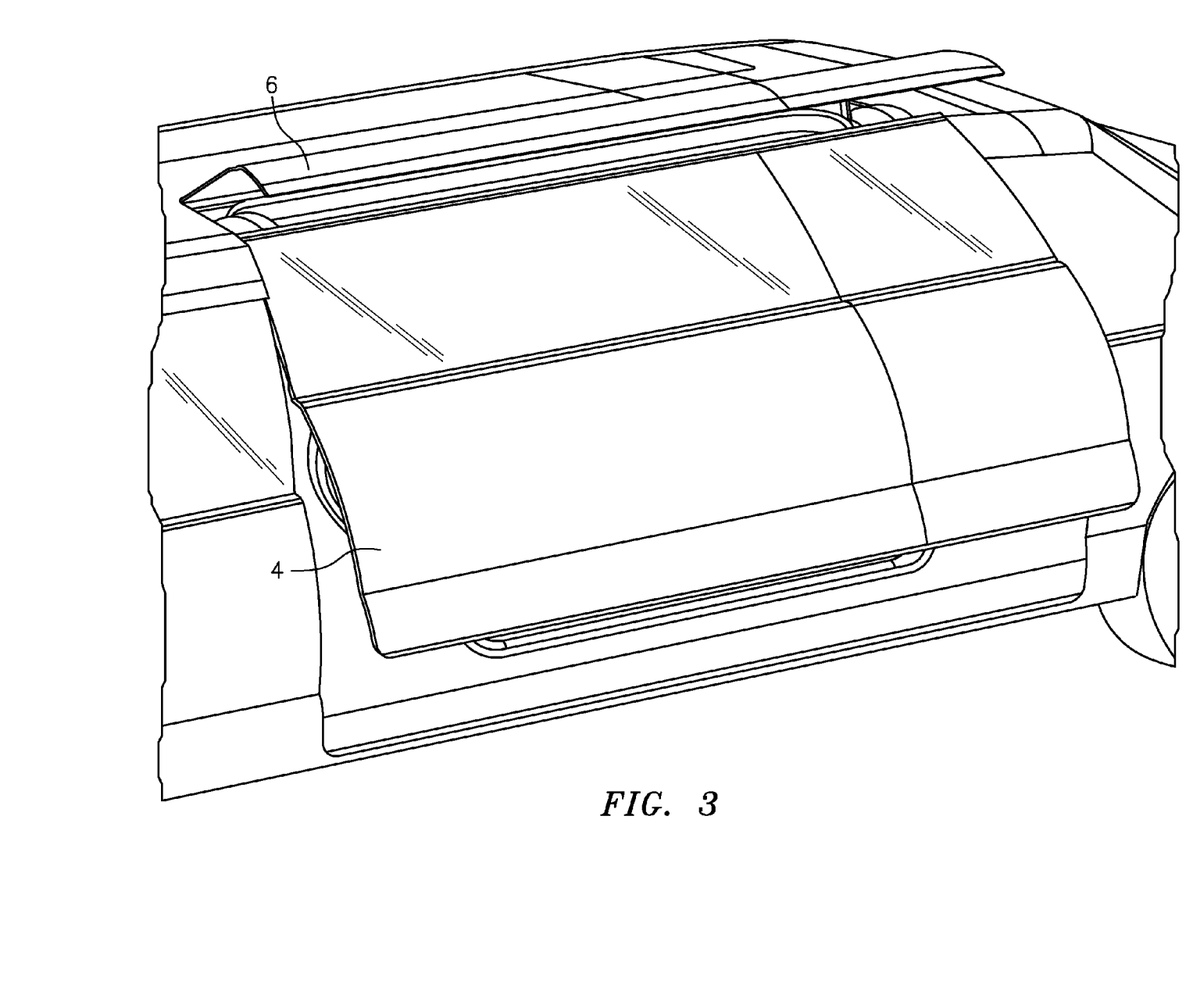
FIG. 3 depicts a view of the gull-wing door in accordance with the present invention in which the door continues to move from a closed position to an open position.
Figure 4:
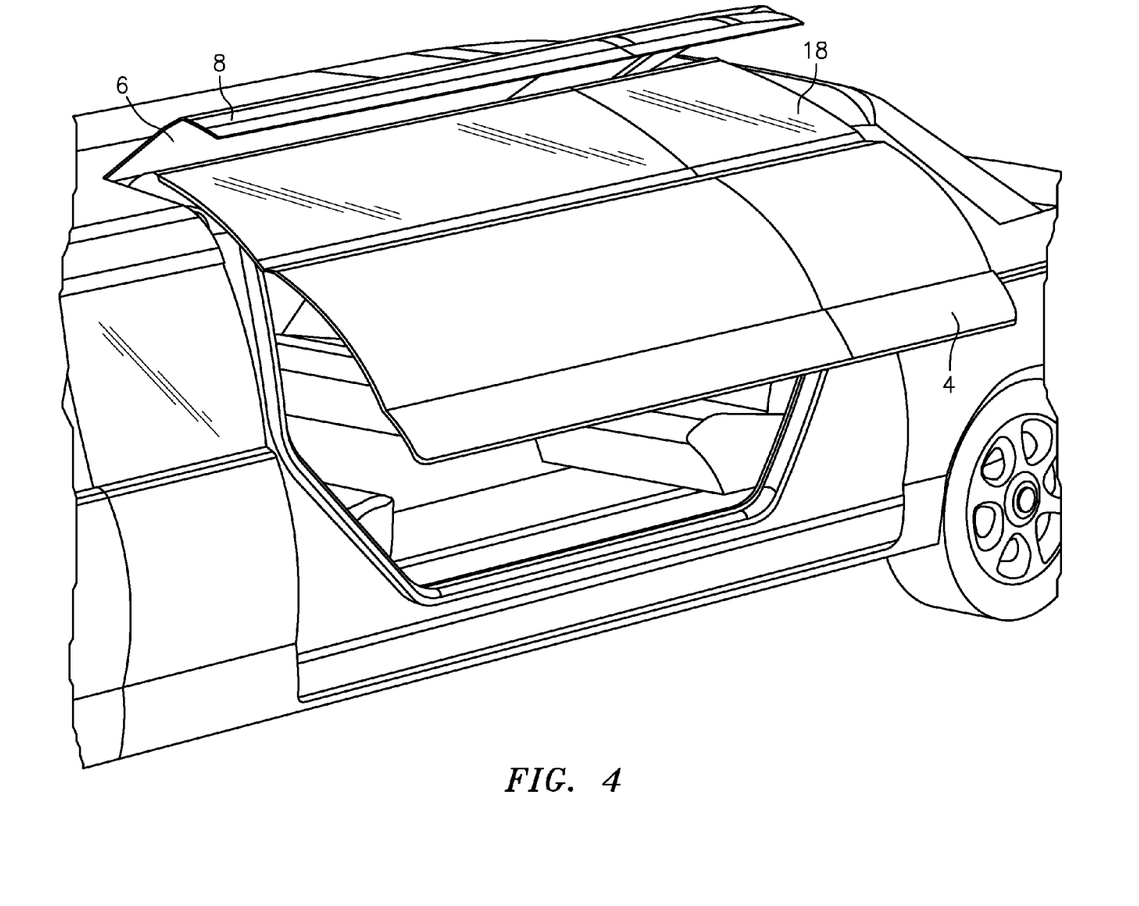
FIG. 4 depicts another view of the gull-wing door in accordance with the present invention in which the door continues to move from a closed position to an open position.
Figure 5:
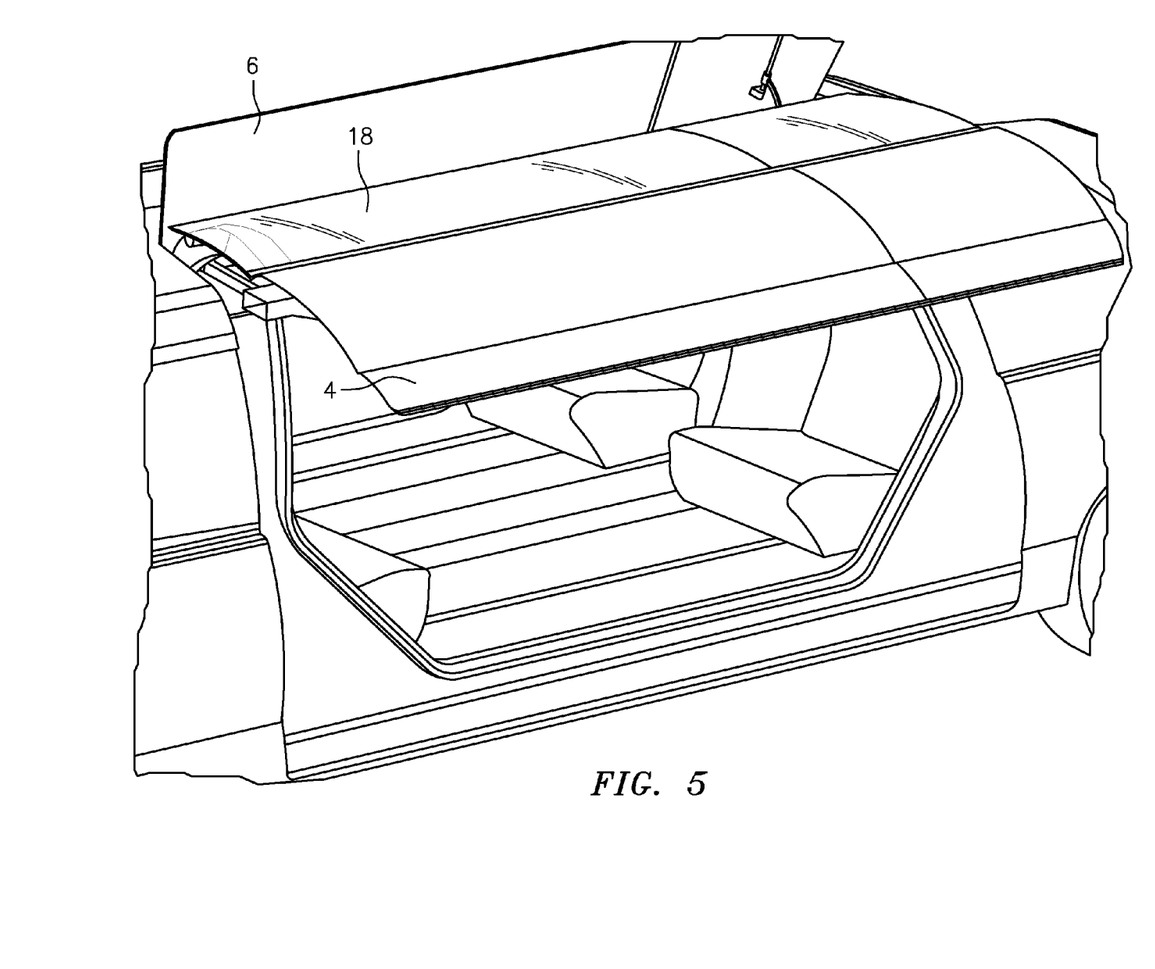
FIG. 5 depicts another view of the gull-wing door in accordance with the present invention in which the door continues to move from a closed position to an open position and is nearly open.
Figure 6:
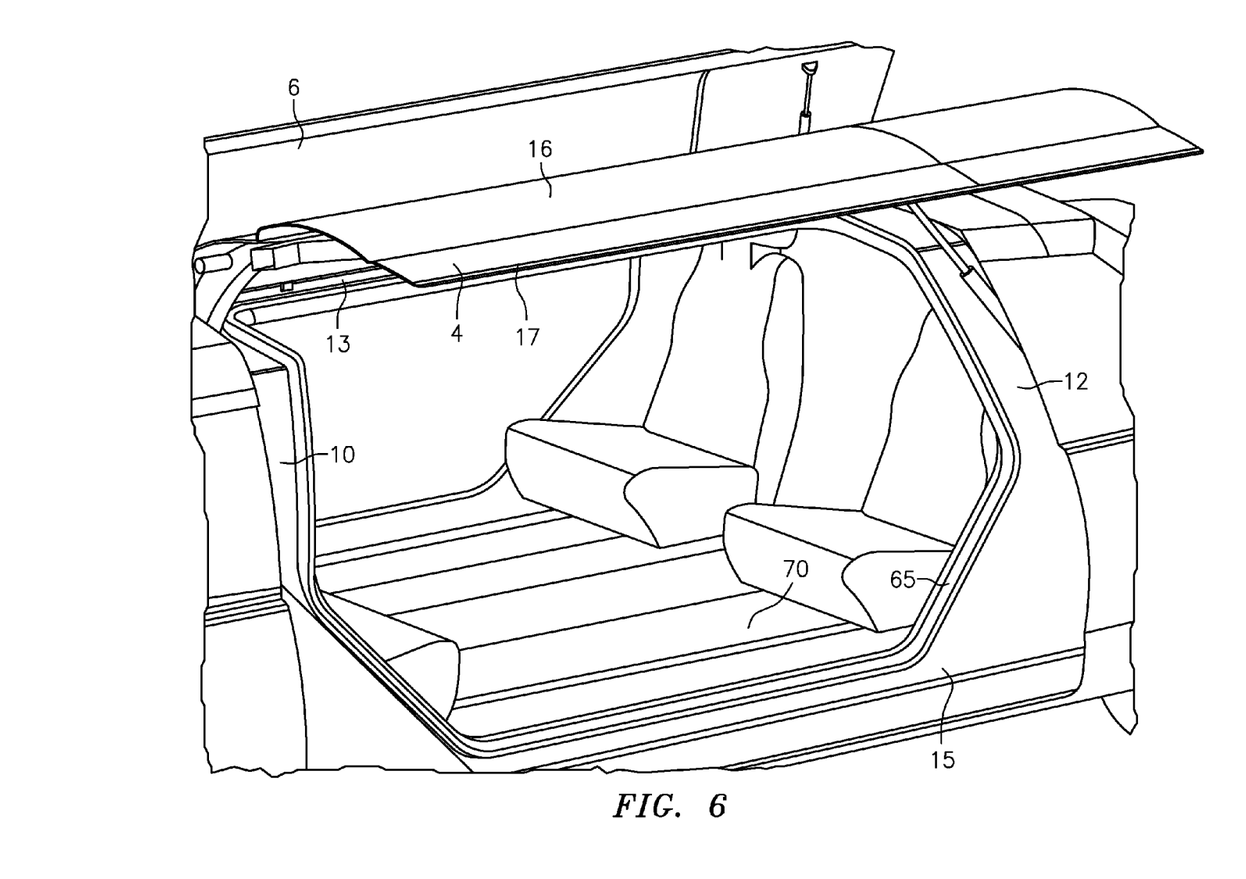
FIG. 6 depicts a view of the gull-wing door in accordance with the present invention in which the door is in its fully opened position.

FIGS. 1-6 depict the operation of the gull-wing door in accordance with the present invention. FIG. 1 depicts the door 2 in a closed position. As seen in FIG. 1, the door comprises a lower section 4 and an upper section 6 and in which the upper section 6 overlaps the lower section 4 when the door 2 is in a closed position to provide a leak proof interface between the upper section 6 and the lower section 4. FIG. 2 depicts the door 2 once it has been unlatched to allow the door 2 to begin moving from a closed position to an open position. FIG. 3 depicts the door 2 as the lower section 4 begins to move inward and the upper section 6 begins to move upward to allow the lower section 4 to slide under the upper section 6. FIG. 4 depicts the door 2 as the lower section 4 reaches its fixed upper pivot point under the upper section 6. As seen in FIG. 4, the upper section 6 may also comprise a rounded lip 8 thereon for overlapping the lower section 4. FIG. 5 depicts the door 2 as the lower section 4 starts to rotate upward upon the upper pivot point and the upper section 6 slides to a near vertical position to allow rotation of the lower section 4. Finally, FIG. 6 shows the door 2 in a fully opened position.

As described herein, the lower section 4 displaces itself along the rails to the fixed upper pivot point and the lower section 4 then rotates upward from this fixed pivot point to a fully opened position. Thus, as seen in FIG. 6 in its fully opened position, the gull-wing door 2 is opened at least 80° as measured from vertical, preferably at least 90° as measured from vertical, and most preferably at least 100° as measured from vertical. The lower section 4 pivots in both the front and rear sides of the door 2 and displaces itself along the rails with linear bearings on each side. This minimizes any misalignment normal to the vehicle centerline. The linear bearings preferably have a 5° tolerance; all of the articulations and rotary displacements are supported by the sealed bearings.

Figure 7:
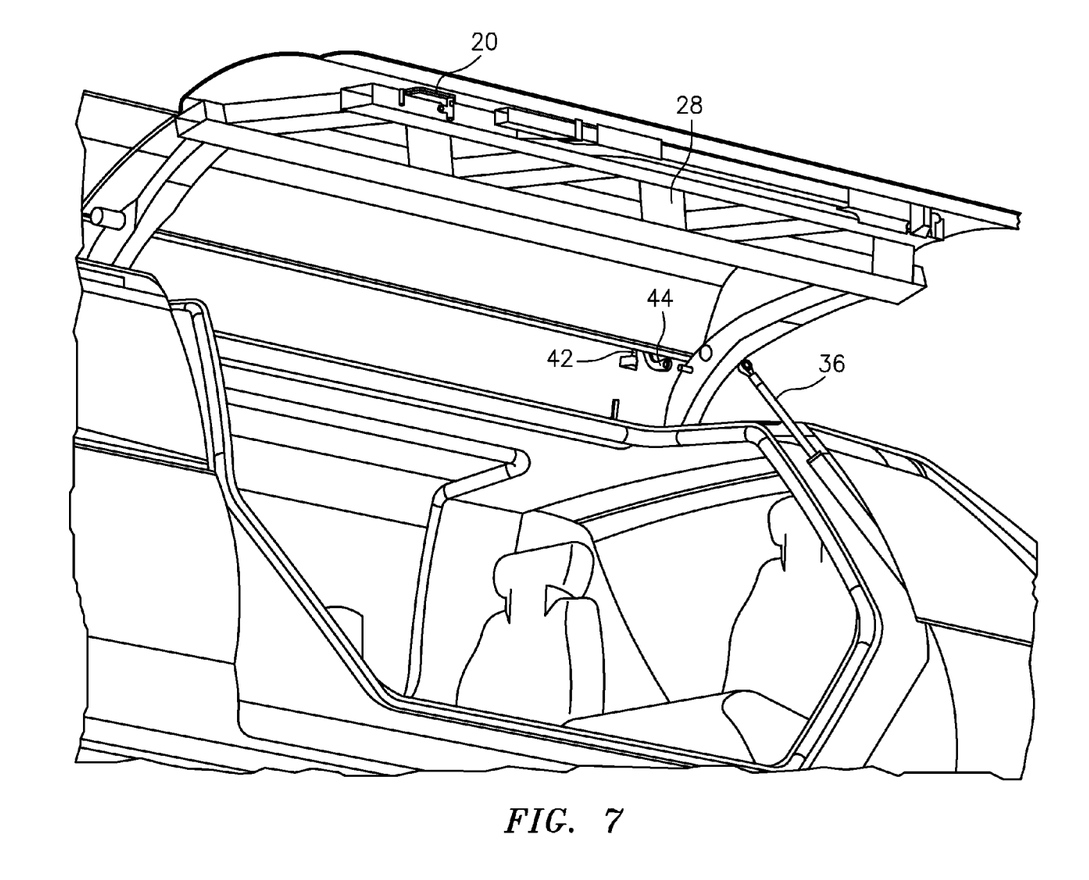
FIG. 7 depicts another view of the gull-wing door in accordance with the present invention in which the door is in its fully opened position.
Figure 8:
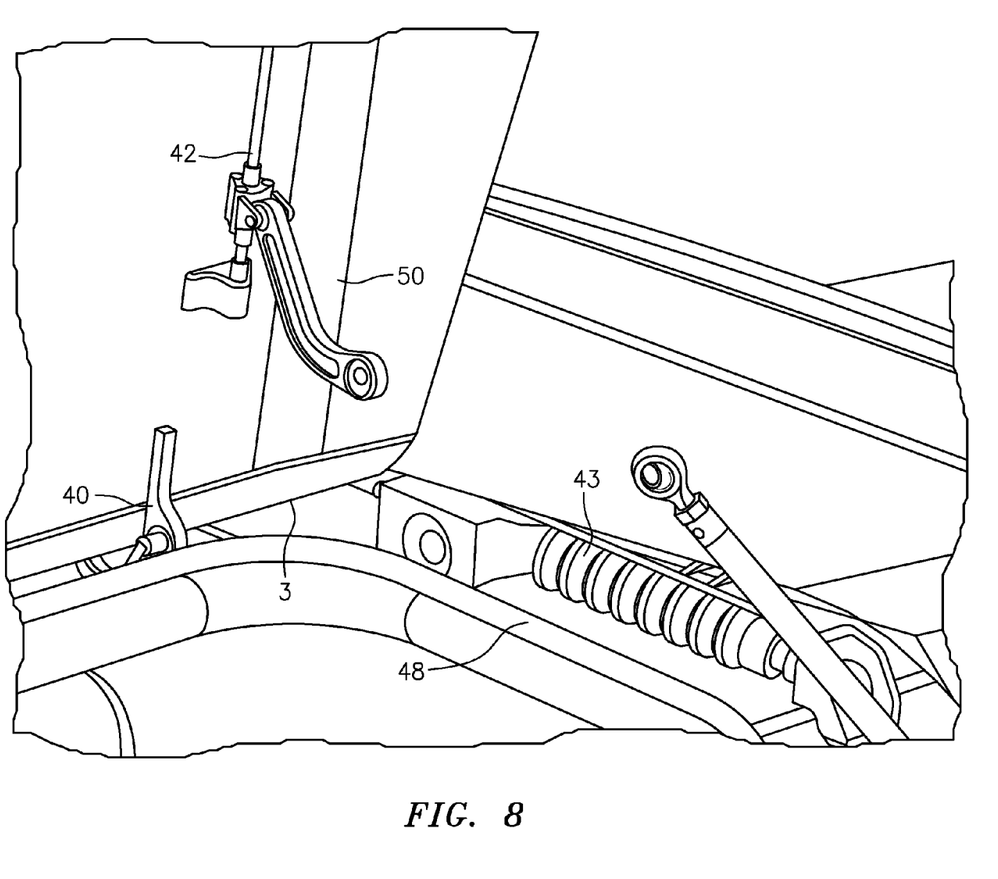
FIG. 8 depict a view of the linkage between the upper section of the door and the lower section of the door in accordance with the present invention.

As best seen in FIGS. 6 and 7, the lower section 4 comprises a tubular frame 28 and a door panel 16 arranged in the tubular frame 28. The door panel 16 comprises a preferably composite structure capable of providing lateral impact protection in the event of an accident. In addition, the lower section 4 also comprises a window 18 (best shown in FIGS. 4 and 5), which is retractable into the door panel 16.

The lower section 4 further comprises a lift support 36 coupled a portion of the vehicle body or to one of the pillars 38. The lift support 36 is capable of moving the lower section 4 of the door 2 from a closed position to a fully opened position and is capable of maintaining the lower section 4 of the door 2 in a fully opened position. In a broad sense, the "lift support" refers to any device that can aid a person in moving a vehicle door in an upward or vertical direction (or, alternatively, in a downward and vertical direction). Various types of lift supports may be used in the practice of the invention, including, but not limited to cylindrical gas springs, spring-loaded telescoping hinges, motorized linear actuators, electromagnetic linear actuators, hydraulic actuators, hydraulic cylinders, pneumatic pumps, and combinations of one or more of the foregoing. The lift support (linear actuator or other device) may be electrically driven so as to provide a power driven operation at the touch of a button.

It is also generally desirable that a motor vehicle door comprise various decorative lights to aid in making the motor vehicle more visible to other motorists. Thus, the lower section may also optionally, but preferably, contain a housing for electrical and decorative lights.

The upper section 6 of the gull-wing door 2 is attached to an upper portion of the vehicle body with a plurality of hinges 40. Preferably, the upper section 6 of the gull-wing door 2 is attached to an upper portion of the vehicle body with at least three hinges 40, more preferably, the upper section 6 is attached with at least four hinges. The hinges may also preferably comprise ball bearings.

The upper section 6 is linked to the lower section 4. More specifically, the upper section 6 comprises a sliding rod 42 that is couplable to a mechanical link 44 in the lower section 4. The mechanical link 44 also preferably comprises bearings to allow easy movement in raising and lowering the upper section 6 as the lower section 4 is raised and lowered. Thus, as the lower section is raised, the mechanical link 44 causes sliding rod 42 to also raise the upper section 6. As best seen in FIG. 6, the upper section 6 rotates upward to a nearly vertical position when the door 2 is in a fully opened position.

That is, to reach the fully open position of the gull-wing door 2, the upper section 6 is linked to the lower section 4 by the mechanical link 44 that follows all of the rotary displacement movement generated by actuators 43 attached to the vehicle body or to one of the pillars 38.

The upper section 6 further comprises a flat seal interface 50 capable of providing a leak proof seal with a corresponding seal 48 in the vehicle body when the door 2 is in a closed position. In addition, the lower section 4 also further comprises a flat seal interface to provide a leak proof seal with a corresponding seal 48 in the vehicle body when the door is in a closed position. The upper section 6 may also house a power supply (not shown) to convey power to the lower section 4 of the door 2.

The gull-wing door also may comprise means for maintaining the gull-wing door in a releasably closed position which means may comprise one or more bear paw latches 20 positioned in the lower section 4 of the door 2. These bear paw latches 20 are capable of engaging with corresponding steel loops (not shown) fixedly attached to the frame of the motor vehicle to maintain the lower section 4 of the door 2 in the releasably closed position. In addition, the one or more bear paw latches 20 are capable of disengaging from the corresponding steel loops to release the lower section 4 of the door 2 and allow the lower section 4 of the door 2 to move from a closed position to an open position. Other similar means for maintaining the door in a releasably closed position would also be known to those skilled in the art.

The one or more bear paw latches 20 are preferably coupled to respective solenoids to allow the bear paw latches 20 to engage and release from the steel loops.

If the door is supplied as a kit, it preferably comprises a modular frame extending between the front pillar 58 and rear pillar 60 of the motor vehicle body. Preferably the modular frame comprises a front frame portion 10 forming a front edge of the modular frame, a rear frame portion 12 forming a rear edge of the modular frame, an upper frame portion 13 connecting the front frame portion 10 and rear frame portion 12 and for receiving an upper edge 3 of the upper section 6 of the door 2 when the door 2 is in a closed position, and a lower frame portion 15 for receiving a lower edge 17 of the lower section 4 of the door 2 when the door 2 is in a closed position. In addition, the modular frame may also comprise gasketed tubular passenger openings 65 and an internal connecting skin, all of which are fixedly attached to the car floor pan 70.

As seen in FIG. 1 the upper section 6 may be disposed in the roof 7 of the vehicle. Thus, the upper section 6 of the door 2 may be hinged to the roof 7 of the vehicle. Furthermore, the lower section 4 of the door 2 and the upper section 6 of the door preferably meet at an angle when the door 2 is in a closed position. Thus, the upper section 6 is preferably hinged to the roof 7 so that the upper section 6 overlaps the lower section 4 at an edge of the roof 7 between the roof 7 and a side of the vehicle. As best seen in FIGS. 1 and 2, the upper section 6 may also optionally, but preferably, contain a rounded lip 8 that overlaps the lower section 4 at an edge of the roof.

All of the sliding and/or telescoping rods may optionally, but preferably, be covered with a sealing boot, to protect the rods and linear bearings from dust and other debris that could clog the sliding rods and bearings, rendering them inoperable. In one embodiment the sealing boot comprises nitrile or another similar rubber having the ability to sustain performance across a wide temperature range and exhibiting superior tear and abrasion resistance. Nitrile rubber is also known as (Buna-N).

The gull-wing door may be equipped with explosive hinges that are capable of releasing the door when the car is involved in a rollover accident (i.e., the car is upside down). That is, when the control unit for the supplemental restraint system detects that the vehicle is upside down, the control unit activates pyrotechnic charges on the hinges of the upper section of the door. Preferably, the pyrotechnic charge does not directly sever the hinge but instead activates a mechanism that mechanically disconnects the hinge from the door.

The gull-wing door may be equipped with lighting that will illuminate upon opening the door so that the user can easily see the surroundings getting in and getting out. As part of the lighting package, the gull-wing door may be equipped with a hologram generator that is capable of generating a hologram image upon the door being opened to increase the notice of onlookers. The hologram image may be customized to the user's preference or style. The gull-wing door may also include a flexible awning that folds within the door when the door is closed but opens, at the option of the user, when the door is opened. Whether the awning opens or not is controlled by a control on the door. The awning is useful in shielding the user from the sun or rain.

It is understood that embodiments of the present invention described herein are suitable for automobiles and other motor vehicles having two doors or four doors. Thus, while the gull-wing door described herein is situated between the middle and rear pillars of the vehicle, the gull-wing door may also be situated between the front and middle pillars of the vehicle. Additionally, in a vehicle having a different number of pillars, the gull-wing door may be situated between any two pillars where it is desirable to utilize a gull-wing door as described herein. Furthermore, such gull-wing doors may be situated on a right or left side of the vehicle and may even be situated on a rear of the vehicle.

In addition, it is also understood that "front" represents a side of the vehicle to which the vehicle proceeds; "rear" represents a side of the vehicle to which the vehicle goes back; "upper" represents an upper side of the vehicle in a perpendicular direction; and "lower" represents a lower side of the vehicle in the perpendicular direction. Finally "right" and "left" represent sides of the vehicle in the width direction.

In another embodiment, the present invention also relates generally to a kit for retrofitting a motor vehicle with a gull-wing door, the kit comprising:

a modular frame configured to extend between the front and rear pillars of a motor vehicle; and an articulated gull-wing door arranged within the modular frame, wherein the articulated gull-wing door comprises:

an upper section and a lower section mounted in the modular frame, wherein the upper section is overlapable with the lower section when the door is in a closed position to provide a leak proof interface;

wherein the upper section is attached to a top of the modular frame with a plurality of hinges and wherein the upper section comprises a sliding rod that is coupled to a mechanical link in the lower section; and wherein the lower section comprises a plurality of linear bearings arranged at an upper portion of a front side and a rear side of the lower section to slidably couple the lower section to corresponding rails attached to upper front and upper rear portions of the modular frame, wherein the lower section is capable of slidably displacing itself in a vertical direction on the rails in the modular frame to fixed upper pivot points and then rotating upward upon the fixed upper pivot points to a fully opened position.

The kit described herein optionally, preferably comprises the articulated gull-wing door and the door seal. Thus, the user does not need to worry with fitting the gull-wing door into an existing door seal. Using the kit described herein, the user can simply weld the entire unit into the car, providing a better, leak-proof seal.

It should also be understood that the following claims are intended to cover all of the generic and specific features of the invention described herein and all statements of the scope of the invention that as a matter of language might fall there between.

What is claimed is:

1. An articulated gull-wing door arranged in a vehicle body, wherein the vehicle body comprises at least front and rear pillars, the articulated gull-wing door comprising:
   an upper section and a lower section mounted in the vehicle body between the front pillar and the rear pillar, wherein the upper section is overlapable with the lower section when the door is in a closed position to provide a leak proof interface;
   wherein the upper section is attached to a top of the vehicle body with a plurality of hinges and wherein the upper section comprises a sliding rod that is coupled to a mechanical link in the lower section; and
   wherein the lower section comprises a plurality of linear bearings arranged at an upper portion of a front side and a rear side of the lower section to slidably couple the lower section to corresponding rails mounted on the vehicle body, wherein the lower section is capable of slidably displacing itself in a vertical direction on the rails to fixed upper pivot points and then rotating upward upon the fixed upper pivot points to a fully opened position.

2. The articulated gull-wing door according to claim 1, wherein the lower section comprises a tubular frame and a door panel arranged about the tubular frame, wherein the door panel comprises a composite structure capable of providing lateral impact protection.

3. The articulated gull-wing door according to claim 2, wherein the lower section further comprises a window, wherein the window is retractable into the door panel.

4. The articulated gull-wing door according to claim 1, wherein the lower section further comprises a lift support coupled to the vehicle body, wherein the lift support is capable of moving the lower section of the door from the closed position to the fully opened position and is capable of maintaining the lower section of the door in the fully opened position.

5. The articulated gull-wing door according to claim 4, wherein the lift support is selected from the group consisting of cylindrical gas springs, mechanical springs, motorized linear actuators, hydraulic actuators, hydraulic cylinders, pneumatic pumps, and combinations of one or more of the foregoing.

6. The articulated gull-wing door according to claim 1, wherein the plurality of hinges attaching the upper section of the door to the top of the vehicle body comprises at least three hinges.

7. The articulated gull-wing door according to claim 1, wherein the upper section comprises a flat seal interface capable of providing a leak proof seal with a corresponding seal in the vehicle body when the door is in the closed position.

8. The articulated gull-wing door according to claim 1, wherein the lower section comprises a flat seal interface to provide a leak proof seal with a corresponding seal in the vehicle body when the door is in the closed position.

9. The articulated gull-wing door according to claim 1, wherein the gullwing door comprises one or more bear paw latches positioned in the lower section of the door that are capable of engaging with corresponding steel loops fixedly attached to a frame of the motor vehicle to releasably maintain the lower section of the door in the closed position, and
   wherein the one or more bear paw latches are capable of disengaging from the corresponding steel loops to release the lower section of the door and allow the lower section of the door to move from the closed position to an open-position.

10. The articulated gull-wing door according to claim 9, wherein the one or more bear paw latches are coupled to respective solenoids.

11. The articulated gull-wing door according to claim 1, wherein the upper section of the gull-wing door is situated in a roof of the motor vehicle and the upper section of the gull-wing door overlaps the lower section of the gull-wing door at an edge of the roof of the motor vehicle.

12. The articulated gull-wing door of claim 1, wherein the door also comprises a lighting system that illuminates the surroundings when the door is opened.

13. The articulated gull-wing door of claim 12, wherein the lighting system comprises a hologram generator that generates a hologram nearby to the door when the door is opened.

14. The articulated gull-wing door of claim 1, wherein the door also comprises a flexible awning that folds within the door when it is closed and opens, at the option of the user when the door is opened.

15. A kit for retrofitting a motor vehicle with a gull-wing door, the kit comprising:
   a modular frame configured to extend between front and rear pillars of a motor vehicle body and an articulated gull-wing door arranged within the modular frame, wherein the articulated gull-wing door comprises:
   an upper section and a lower section mounted in the modular frame, wherein the upper section is overlapable with the lower section when the door is in a closed position to provide a leak proof interface;
   wherein the upper section is attached to a top of the modular frame with a plurality of hinges and wherein the upper section comprises a sliding rod that is couplable to a mechanical link in the lower section; and
   wherein the lower section comprises a plurality of linear bearings arranged at an upper portion of a front side and a rear side of the lower section to slidably couple the lower section to corresponding rails attached to upper front and upper rear portions of the modular frame, wherein the lower section is capable of slidably displacing itself in a vertical direction on the rails in the modular frame to fixed upper pivot points and then rotating upward upon the fixed upper pivot points to a fully opened position.

16. The kit according to claim 15, wherein the lower section comprises a tubular frame and a door panel arranged about the tubular frame, wherein the door panel comprises a composite structure capable of providing lateral impact protection.

17. The kit according to claim 16, wherein the lower section further comprises a window, wherein the window is retractable into the door panel.

18. The kit according to claim 15, wherein the lower section further comprises a lift support couplable to the motor vehicle body, wherein the lift support is capable of moving the lower section of the door from the closed position to the fully opened position and is capable of maintaining the lower section of the door in the fully opened position.

* * * * *